H. HARVEY.
WEIGHING MACHINE.
APPLICATION FILED JAN. 10, 1917.
1,327,553.
Patented Jan. 6, 1920.
2 SHEETS—SHEET 1.
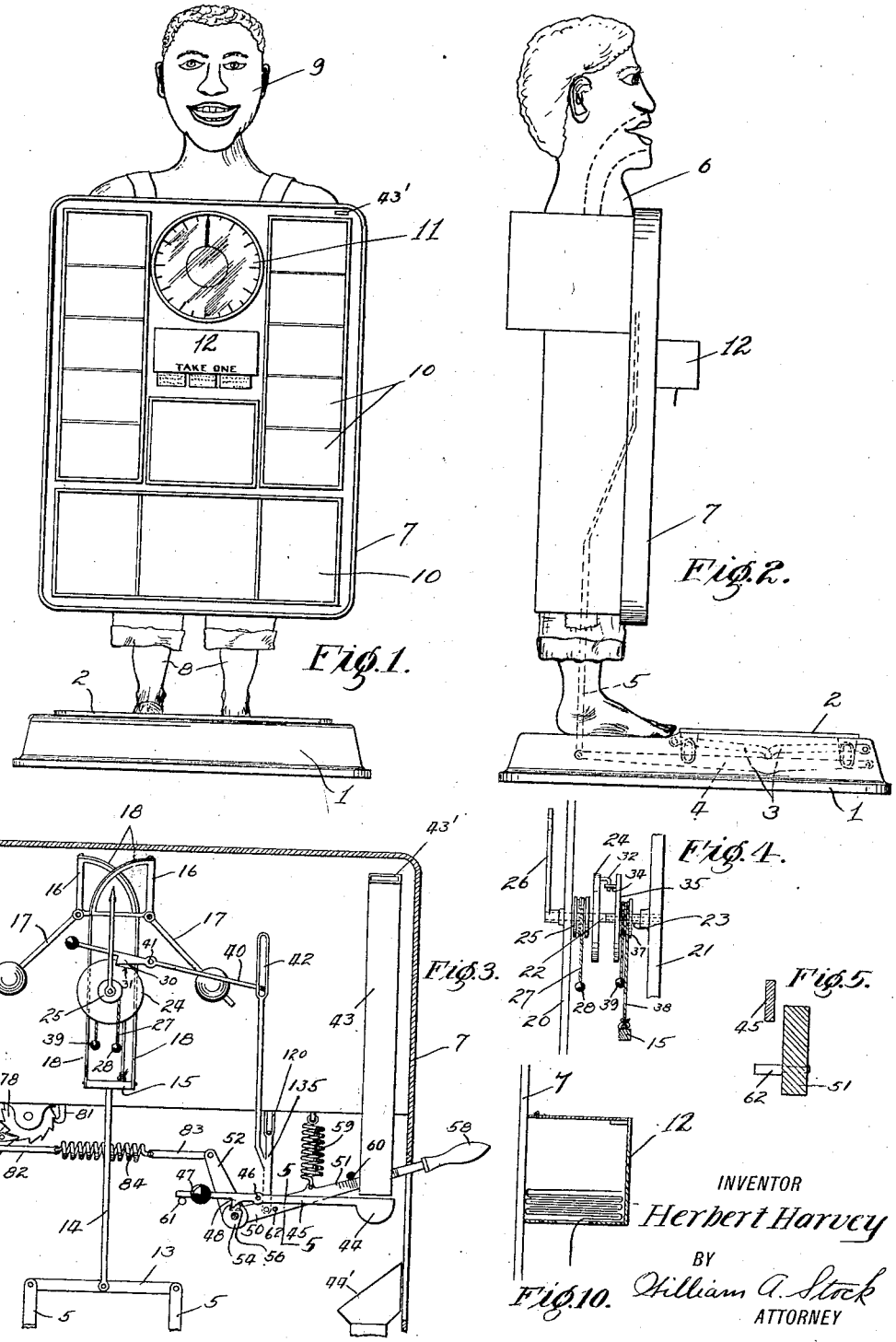

H. HARVEY.
WEIGHING MACHINE.
APPLICATION FILED JAN. 10, 1917.
1,327,553.
Patented Jan. 6, 1920.
2 SHEETS—SHEET 2.
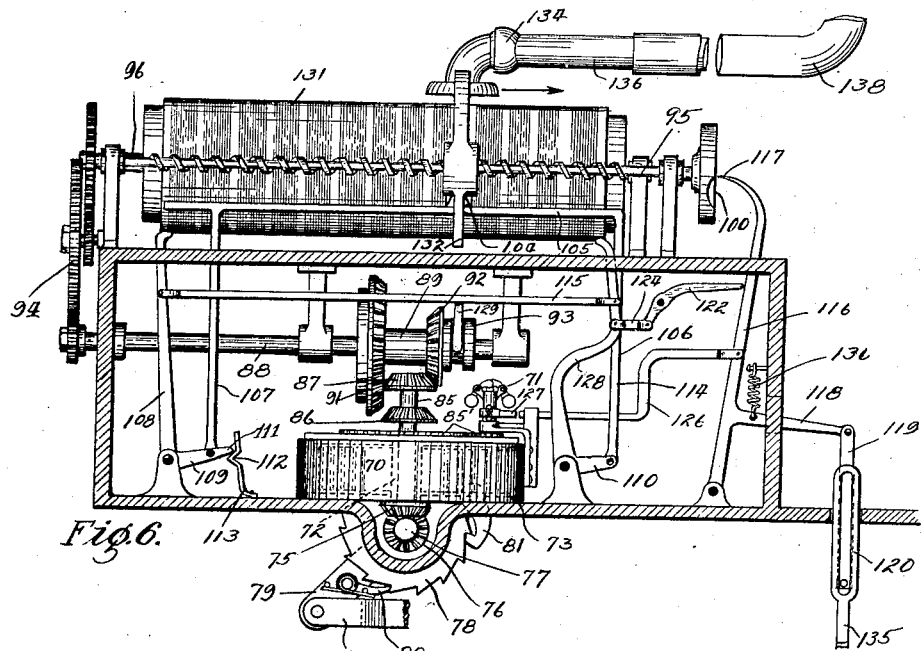
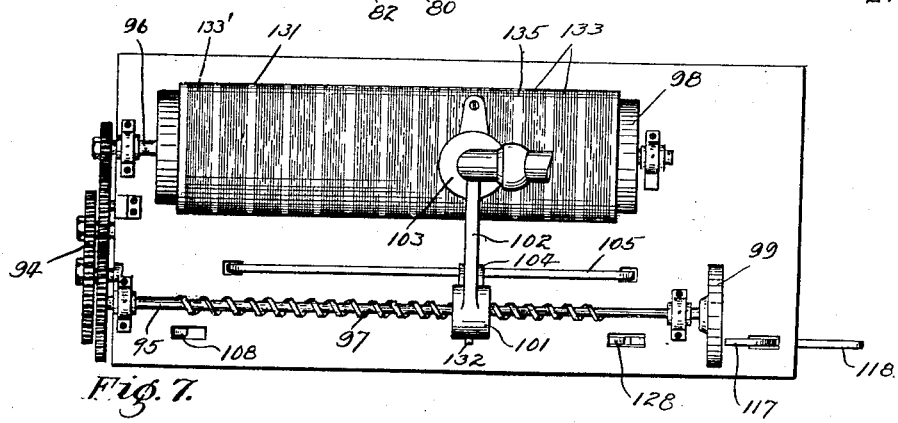
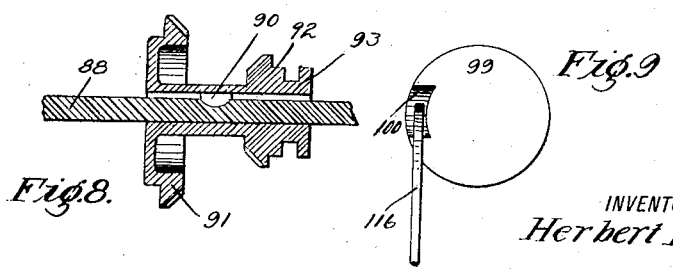
INVENTOR
*Herbert Harvey*
BY
*William A. Stock*
ATTORNEY

UNITED STATES PATENT OFFICE.

HERBERT HARVEY, OF OAKLAND, CALIFORNIA.

WEIGHING-MACHINE.

1,327,553.  Specification of Letters Patent.  Patented Jan. 6, 1920.

Application filed January 10, 1917. Serial No. 141,901.

*To all whom it may concern:*

Be it known that I, HERBERT HARVEY, a subject of the King of England, residing at 5620 Telegraph Avenue, in the city of Oakland, in the county of Alameda and State of California, have invented certain new and useful Improvements in Weighing-Machines, of which the following is a specification.

This invention relates to improvements in weighing machines and more particularly to a weighing scales combined with certain other novel features to give the device added attractions. The principal object of the invention is to construct a weighing machine which when operated reproduces a series of sounds such as calling attention to certain wares and making a spoken argument in their favor. Or in place of utilizing the sound reproducing features for advertising purposes it may be used to give a short musical or vocal selection each time the scales is operated.

Another object is to construct the machine in an attractive form, such as showing a human figure to which the speaking apparatus is connected that the sounds appear to issue from the mouth of this figure. Another object is to provide a simple and effective apparatus for accomplishing these objects in which the various parts are so arranged and interlocked that the device will not be injured by improper use.

With these and other objects the invention consists of certain novel features of construction, combinations and arrangements of parts hereinafter described and more specifically pointed out in the appended claims; it being understood that changes in form, proportion, size and minor details of construction within the scope of the claims may be resorted to without departing from the spirit of the invention or sacrificing any of the advantages thereof.

To more fully comprehend the invention reference should be had to the drawings forming a part of the specification and wherein—

Figure 1 is a view in front elevation of a weighing machine constructed in accordance with the invention.

Fig. 2 is a view in side elevation of the same.

Fig. 3 is a view in front elevation with the casing removed showing a portion of the operating mechanism.

Fig. 4 is a view in side elevation of the mechanism for operating the weight indication pointer.

Fig. 5 is an enlarged view in section on the line 5—5 Fig. 3.

Fig. 6 is a view in front elevation of the sound reproducing mechanism and associated parts.

Fig. 7 is a view in plan of the same.

Fig. 8 is an enlarged view in section of the shifting gear mechanism for returning the reproducing mechanism to its starting point.

Fig. 9 is a view in elevation of the cam disk used for stopping the reproducing mechanism.

Fig. 10 is an enlarged view in section through the dispensing apparatus located on the front of the figure.

Referring to the corresponding parts in the several views by the same numerals of reference, 1 denotes the base of the weighing machine in which is mounted the movable platform 2. The latter is mounted on any preferred arrangement of weighing levers 3, through which the movement of the platform is communicated to the lever 4, running to the back of the machine, and to the rear end of which is connected the links 5.

On the base 1 stands a figure 6 which may be in the form of a negro and which from the front appears to be carrying a sandwich board 7. In the actual construction only the feet 8 and head 9 are actually molded the board 7 covering the rest of the figure and concealing certain compartments in which the operating mechanism is located.

The board 7 is provided on its face with spaces 10 in which legends or advertisements are displayed, the weight indicating dial 11, and the dispensing apparatus 12. The matter shown in these spaces may be of any form such as cards displayed under glass, printed on transparent material and provided with suitable illuminating means.

The dispensing apparatus is intended to carry folded circulars in connection with the advertisements or other matter displayed on the board 7 and as shown in Fig. 10 these circulars are interfolded so that the act of withdrawing one will expose the end of another.

Referring now more particularly to Figs. 3 and 4, it will be seen that the top ends of the links 5, one of which runs up each leg of the figure 6, are connected to a cross bar 13, to the center of which is connected rod 14 having attached to its upper end the yoke member 15. Pivotally mounted in the upper part of the machine are two segmental members 16, having the weighted rods 17 extending therefrom, that form the balancing elements for the weighing mechanism. Attached to the upper part of the segmental members are the flexible tapes 18, the lower ends of which are connected to the yoke member 15. Thus any downward movement of rods 5, is communicated to the segmental members 16 causing the arms 17 to be thrown outwardly until the increased leverage balances the weight on the platform.

Pivotally mounted in the frame members 20 and 21 are shafts 22 and 23 which are in axial alinement, but are capable of independent rotation. Attached to shaft 22 is the disk 24, the flanged wheel 25, and the indicating hand 26. A flexible cord 27 is given several wraps around the wheel 25 and one end thereof is made fast to the wheel, while the other end hangs free and carries a weight 28. This construction is such that when the shaft is free to turn, the weight will cause it to rotate in a clock-wise direction. Normally such movement is prevented by a tooth 30 engaging a notch 31 in the periphery of the disk 24 and which is removed by certain operations hereinafter described. On the rear face of disk 24 is an outwardly extending hook 32 adapted to coöperate with a pin 34 in the disk 35 and on the shaft 23 is a wheel 37 around which passes a flexible cord 38 which has one end fastened to the yoke 15, the other end being free and carrying a weight 39. Cord 38 is wound upon wheel 37 in such a manner that the weight 39 tends to rotate this section of the shaft in the opposite direction to section 22.

As heretofore explained disk 24 is normally locked by tooth 30 carried by the swinging arm 40. The latter is pivotally mounted as at 41 and weighted on the end carrying the tooth 30, the opposite end engaging the slotted link 42, so that when this end is pulled down the tooth is raised, releasing disk 24. As here illustrated the device is arranged to be coin controlled though it will be understood that it can be operated by omitting this feature the control being effected by the movemnt of handle 58.

In the upper part of the board 7 is a coin slot 43' from which extends a tube 43 to a coin receptacle 44, on the end of an arm 45 that is pivotally mounted as at 46. On the opposite side of the pivot point this arm carries a weight 47 and the tooth 48. 50 denotes a bell crank lever which has the arms 51 and 52, is pivotally mounted as at 53 and is provided with an extension hub 54. This hub is slotted as shown at 56, the tooth 48 being adapted to enter this slot and prevent rotation of the lever 50 under certain conditions. The arm 51 of lever 50 extends through the case of board 7 and is there provided with a handle 58, by which the lever may be depressed to wind a certain spring motor hereinafter described. A spring 59 serves to restore the lever to its normal position which is determined by a stop 60. Likewise the normal position of the arm 45 is determined by the stop 61.

In arm 51, below the normal position of swinging arm 45, is a pin 62 that extends outwardly into the path of this lever. This arrangemnt is such that when a coin is received by the receptacle 44 the lever only drops until it contacts with the pin the movement being enough to withdraw tooth 48 from slot 56, but when the bell crank is moved down, arm 45 moves with it and at its lowermost point discharges the coin.

The talking mechanism, illustrated in Figs. 6 to 8 inclusive, consists of a spring motor 70 the movement of which is regulated by a governor 71. This motor has the usual coiled spring the inner end of which is fastened to a sleeve 72 that extends through the casing 73. Pivotally mounted on the same shaft is an arm 79, which carries a pawl 80 adapted to engage the teeth of ratchet wheel 78. A similar pawl 81 is pivotally mounted on the stationary part of the casing and holds the wheel during the return movement of arm 79.

Pivotally attached to the end of the arm 79 is a link member 82 that is connected to a like member 83 through the spring 84. Member 83 is pivotally attached to the outer end of arm 52. This spring has a slightly greater strength than the spring of the motor 70, so that in case of the latter being fully wound the bell crank 50 can be moved to its limit without damage to the motor and yet if the latter is not fully wound, the movement of the bell crank will be transmitted to the motor spring.

The other end of the motor spring is attached to a revoluble outer drum from which the motion is communicated through a series of toothed gear wheels 85' to a shaft 85 on which are attached two toothed gears 86 and 87. Journaled in suitable bearings is a shaft 88 on which a sleeve 89 is slidably mounted on the spline 90. This sleeve has formed thereon toothed gears 91 and 92 that are adapted to receive the shipper yoke 129.

Shaft 88 through a suitable train of toothed gears 94 drives the shafts 95 and the shaft 96, the former of which is provided with screw threads 97, the latter 96 carrying the mandrel 98, for the phonographic record cylinder 131. This cylinder has on its surface a number of records 133 each separated by an interval of nonreproducing space 135. The number of reproductions thus impressed on a cylinder is generally equal to the number of legends carried by the board and refer to the same subject matter.

Screw threads 97 are so pitched that during one revolution of shaft 95 reproducer 103 will be moved through a distance equal to the combined length of a record 133 and a space 134. In threaded engagement with this shaft is a member 101 having a short arm 132 adapted to contact with the arms 108 and 128. These arms each form one arm of a pivotally mounted bell crank, the other arms 109 and 110 respectively being pivotally attached to the bars 107 and 114 extending down from the bar 105. In addition the arms 108 and 128 are connected adjacent their free ends by a cross-bar 115 on which the shipper yoke 129 is carried. To cause the arms 108 and its associated parts to assume either one of its extreme positions, I provide the end of arm 109 with the double beveled end 111 which by coöperation with the angular portion 112 of spring 113 causes such action.

On one end of the shaft 95 is a flat disk 99 having a notch 100 that controls the stopping of the reproducing mechanism. Within the casing is pivotally mounted a lever 116 having the curved upper end 117 adapted to contact with the face of disk 99 and to drop into the notched portion 100. A spring 130 tends to hold the end 117 in contact with the face of the disk. Extending laterally from this lever is an arm 118 to which is pivotally attached a link 119, the lower end of which contains a pin which engages the slotted end 120 of the bar 135. The latter is joined to bar 42 and on its lower end is connected to the arm 51. Pivotally attached to the lever 116, intermediate its length is a bar 126 the other end of which is slidably mounted in a suitable support and is adapted to engage the arm 127 extending outwardly from the governor 71.

A bell crank lever 122 is pivotally mounted and has one adapted to contact with the lever 116 and the other end being connected to the arm 128 through the link 124.

The sound tube extending from the reproducer consists of the parts 134 and 138 which are slidable in each other, the former being connected to the reproducer through a universal joint 134 to allow a slight upward movement of the reproducer when it is lifted for a shifting from one end of the record cylinder to the other. The other part 138 is curved upwardly into the head 9 where the open end is positioned adjacent the mouth so that the sound will appear to issue therefrom.

The directions for operating the device are as follows: First: "Stand on platform, then deposit coin, and then pull down handle". When a coin is deposited in the opening 43 it falls into the receptacle 44 and moves the arm into contact with the pin 62 and withdraws tooth 48 from notch 56. When the handle 56 is then moved downward the coin arm is permitted to swing down also and at its lowermost point the coin falls into the chute 44 leading to a coin box (not shown). The downward movement of the lever 50 through the connecting members 82, 83 and spring 84 moves arm 79 and thus the ratchet wheel 78. This in turn is communicated through the gears 75 and 76 to sleeve 72 winding the motor spring a given amount or what is normally a little more than sufficient to operate through one record.

Lever 51 on its downward movement carries with it the bar 135 and through the slotted connection 42 and 120, moves members 40 and 116 at the lowermost point of its travel. The former withdraws latch 30 from notch 31 permitting rotation of the disk 35 under the impulse of the weighted cord 27. When the person first steps on the platform the movement thereof is communicated through rods 5 and 14 to the cross bar 15. The latter is connected by the flexible cord 38 with the wheel 37 so the latter, the shaft 23 and disk 35, move a corresponding amount. Thus the pin 34 is positioned at a point that when the disk 24 is released hook 32 contacts with the pin and is thus positioned at a point which indicates the weight of the person on the scales.

When the machine is in its normal condition the upper end of the lever 116 rests in the depression 100 and the movement of bar 135 withdraws it from this position and at the same time through the rod 126 releases the governor. This allows the driving mechanism to operate and before the handle 58 returns to its normal position, disk 99 has rotated a sufficient distance that the end of lever 116 contacts with the flat surface of disk 99 and the lever cannot return to a position which would stop the governor.

At this time the reproducer is in contact with the record cylinder and the movement continues until one of the records on the cylinder has been reproduced by which time the disk 99 has made one revolution allowing the end 117 to drop into the notch 11 under the impulse of spring 130. This throws the rod 126 into the path of the governor and stops the motor.

Now when the end record 133′ is reached arm 132 contacts with the end of arm 108 and throws it to the left as viewed in Fig. 6, just before the end 117 drops into the notch 100. This movement causes the shipper yoke to shift sleeve 89 disengaging gear 91 with 86 engaging gears 92 and 98, this reverses the direction of movement of the record mandrel and the lead screw 97. At the same time the reproducer is raised by bar 105 and the free end of lever 122 is projected into the path of lever 116 so that the end 117 cannot fall into the notch 100. The return movement continues until the arm 132 contacts with arm 128 which in a similar manner reverses the driving mechanism, removes lever 122 permitting the end 117 to fall into the notch to stop the mechanism and drops the reproducer into the first record.

The arrangement of the container 12 is such that the leaflets therein are interfolded and when one is withdrawn the end of the next one is freed. These leaflets may be used in connection with the spoken matter, as by the figure requesting that one be taken and carefully read.

It will be thus apparent that I have provided a device of novel construction and amusing features and I claim as new and wish to cover by Letters Patent:

1. The combination of a weighing machine having a weight indicating dial and a pointer, means normally holding said pointer against movement, a phonograph, a spring motor for operating said phonograph, means for normally preventing the operation of said phonograph, a winding lever for said motor and means operable by the movement of said lever for releasing said pointer and said phonograph apparatus.

2. The combination of a weighing machine, having a weight indicating dial and a pointer, means normally holding said pointer against movement, a phonograph, a spring motor for operating said phonograph, means for normally preventing operation of said phonograph, a winding lever for said motor and means operable by the movement of said lever for releasing said pointer and said phonograph apparatus.

3. The combination of a weighing machine provided with an upright standard in the form of a human figure, a weight indicating pointer carried in said standard, means normally holding said pointer against movement, a phonograph, a spring motor for said phonograph, a winding lever for said motor and means carried by said lever for releasing said indicating arm and said motor.

4. The combination of a weighing machine provided with an upright standard in the form of a human figure, a weight indicating pointer carried in said standard, means normally holding said pointer against movement, a phonograph, a spring motor for said phonograph, a winding lever for said motor, means for normally holding said motor against movement, means operable by said lever for releasing said pointer and said motor, holding means and means operable by said phonograph for stopping said motor.

5. The combination of a weighing machine having an upright standard in the form of a human figure, a weight indicating pointer carried in said standard, a phonograph in said standard, means normally holding said pointer against movement, a spring motor for operating said phonograph, a winding lever, a record cylinder having a plurality of records, means for stopping said motor after the reproduction of each record, and means operable by said winding lever for releasing said pointer and said motor on each operation of the winding lever.

6. The combination of a weighing machine having an upright standard in the form of a human figure, a weight indicating pointer carried thereby, means normally holding said pointer against movement, a phonograph in said standard, operating mechanism for said phonograph, a spring motor for operating said mechanism, means for normally holding said motor against movement, a winding lever, a record cylinder having a plurality of records, means for stopping said mechanism after the reproduction of each record, and means for reversing said mechanism after the reproduction of the last record and means operable by said winding lever for releasing the holding means of said pointer and said motor.

7. The combination of a weighing machine having a standard in the form of a human figure, a weight indicating pointer in said standard, means normally holding said pointer against movement, a phonograph in said standard, a record cylinder, a plurality of records on said cylinder, a reproducer, driving mechanism for said record cylinder, a motor, means operable by said driving mechanism for stopping said motor after the reproduction of each record, means for reversing said driving mechanism to return said reproducer to its starting position when all of said records have been reproduced, and means for starting said motor each time said pointer is released.

In testimony whereof I affix my signature.

HERBERT HARVEY.